April 29, 1952 R. SHELTON ET AL 2,595,005
COMBINED DRIP PAN AND GAS BURNER STRUCTURE
Filed Nov. 26, 1947 2 SHEETS—SHEET 1
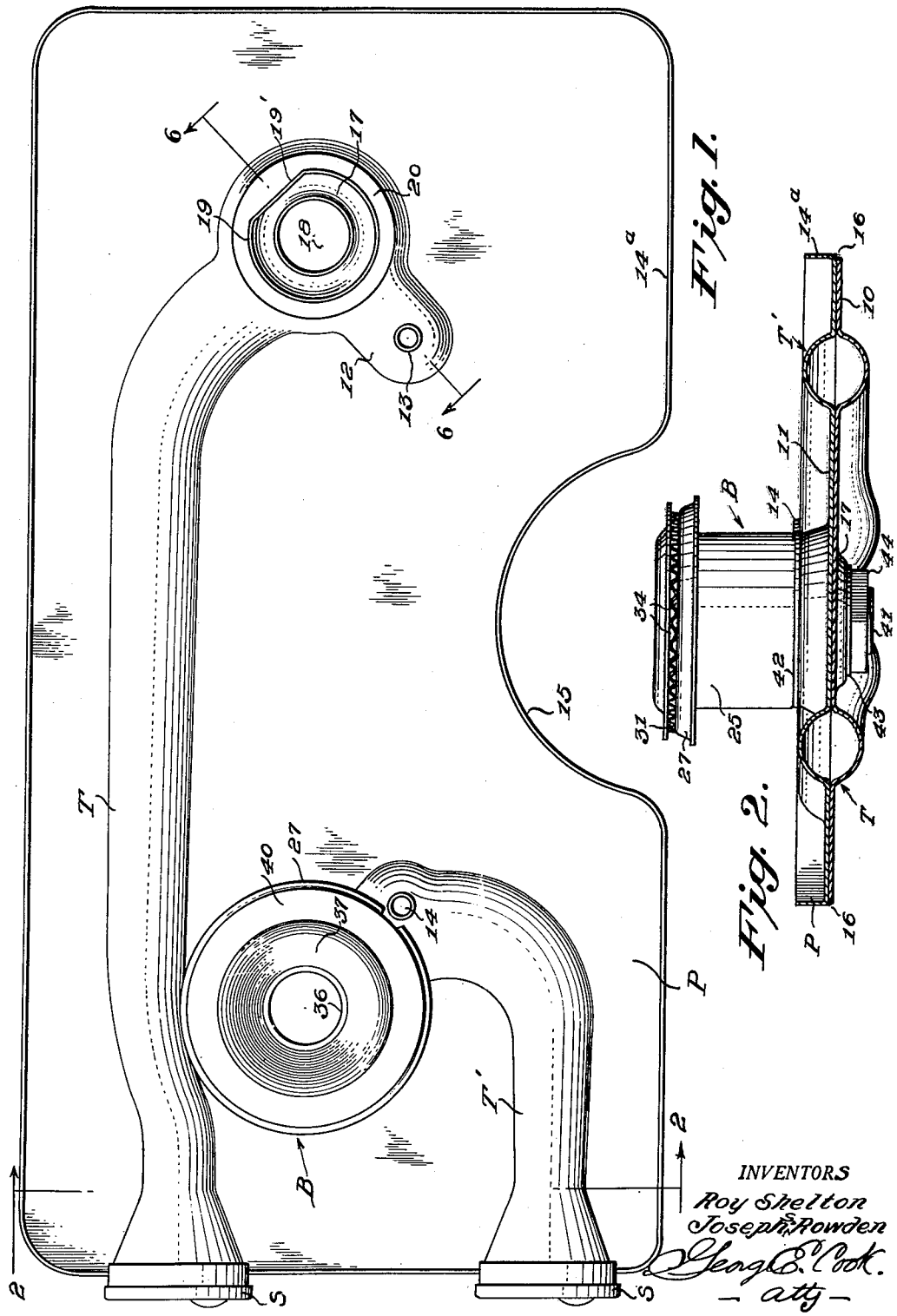
INVENTORS
Roy Shelton
Joseph Rowden
George E. Cook
atty April 29, 1952  R. SHELTON ET AL  2,595,005
COMBINED DRIP PAN AND GAS BURNER STRUCTURE
Filed Nov. 26, 1947  2 SHEETS—SHEET 2
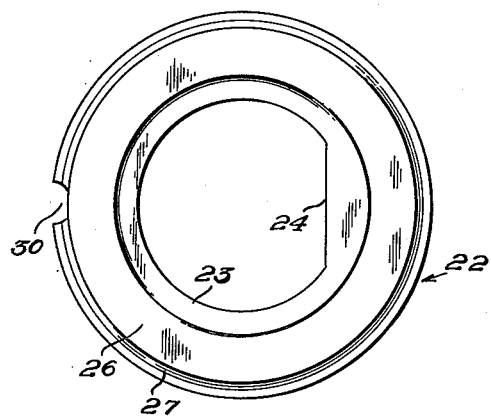
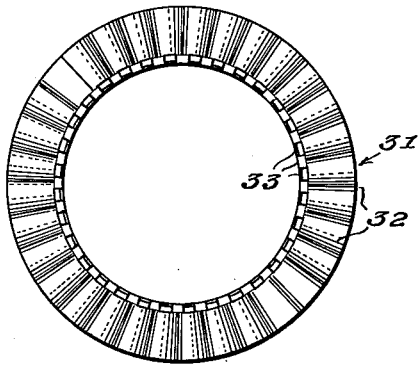
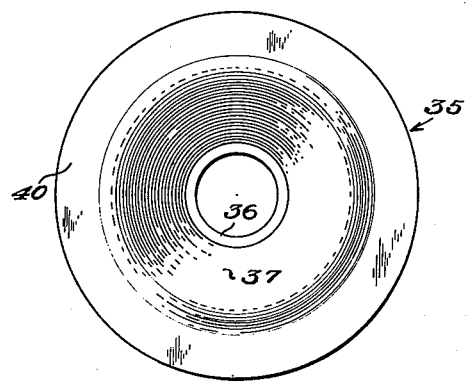
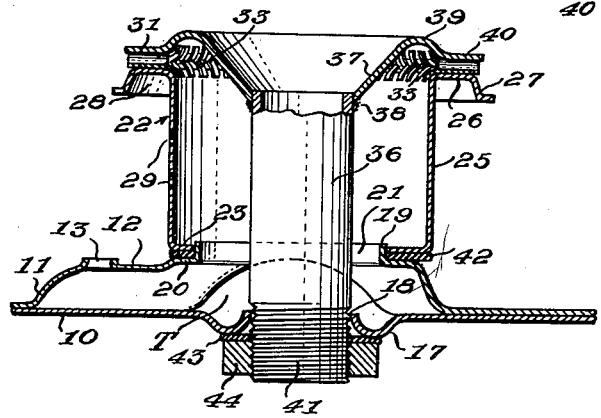
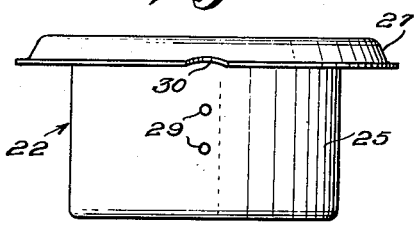
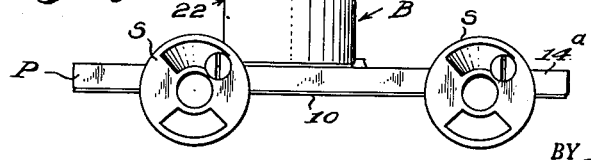
INVENTORS
Roy Shelton
BY Joseph S. Rowden
George E. Cook
— atty —

Patented Apr. 29, 1952

2,595,005

UNITED STATES PATENT OFFICE 2,595,005

COMBINED DRIP PAN AND GAS BURNER STRUCTURE

Roy Shelton and Joseph S. Rowden, Chattanooga, Tenn., assignors to Samuel Stamping & Enameling Company, Chattanooga, Tenn., a corporation of Tennessee Application November 26, 1947, Serial No. 788,164

6 Claims. (Cl. 158—105)

1

This invention relates to a gas burner structure.

The invention is more particularly concerned with a combined drip pan and gas burner structure wherein the Venturi tubes are unitary parts of the drip pan and the burner units are detachably secured to the drip pan adjacent corresponding ends of the Venturi tubes.

A primary object of the invention is the provision of a combined drip pan and gas burner structure wherein the drip pan comprises two plates of thin sheet metal in face to face contact and suitably secured together, the two metal plates being pressed outwardly in opposite directions in the provision of Venturi tubes, and a gas burner unit being detachably secured to the drip pan adjacent an end of each of the Venturi tubes.

A further object of the invention is the provision of a combined drip pan and gas burner structure wherein the Venturi tubes are unitary with the drip pan and gas burner units are removably secured to the drip pan, the pan and burner units being porcelain finished and being devoid of abrupt irregularities whereby the cleaning of the combined drip pan and burner structure is greatly facilitated.

A still further object of the invention is the provision of a gas burner unit having ready detachable connection with a Venturi tube and wherein such unit includes few readily separable parts whereby the unit may be quickly and effectively cleaned.

A still further object of the invention is the provision of a combined drip pan and gas burner structure which is simple in construction, neat in appearance, durable in use, efficient in operation, and which is capable of manufacture at relatively low cost.

With these objects in view, other objects and advantages of the invention will become apparent in the course of the following detailed description taken in connection with the accompanying drawings, wherein:

Fig. 1 is a top plan view of the combined drip pan and gas burner structure in accordance with a preferred embodiment thereof, the view being on a scale substantially less than actual size.

Fig. 2 is a transverse vertical section in the plane of line 2—2 on Fig. 1.

Fig. 3 is a top plan view of the burner cup, the view being substantially on full size scale.

Fig. 4 is a plan view of the improved port ring.

2

Fig. 5 is a top plan view of the port ring retaining member.

Fig. 6 is a vertical transverse section in the plane of line 6—6 of Fig. 1.

Fig. 7 is a front elevational view on a reduced scale of the combined drip pan and burner structure illustrated in Fig. 1.

Fig. 8 is a side elevation view of the burner cup.

Referring now in detail to the drawings, the improved construction generally comprises a drip pan P, Venturi tubes T, T' unitary with the drip pan and having the usual air regulating shutters S, and a burner unit B detachably connected with the drip pan adjacent the end of each Venturi tube opposed to the free end provided with the shutter S.

The drip pan is formed of two plates of metal of relatively light gauge, the lower plate being designated 10 and the upper plate designated 11. The two plates are in firm face to face contact, and before assembly thereof they are pressed in the provision of the cooperating half Venturi tube sections as is more clearly shown in Fig. 2.

The plate 11 is further pressed in the formation of a ridge 12 which defines with the lower plate 10 a gas chamber in communication with tube T. The ridge 12 is provided with a relatively large gas port 13 and a similar port 14 is provided in the tube T'.

The upper pan plate 11 is provided with a vertically disposed flange 14ª extending around its perimeter and the plates and flange may be inwardly curved as at 15 to provide for a pilot used in an automatic lighting mechanism.

As before stated the pan forming plates 10 and 11 are rigidly secured together and which may be effected by welding as indicated at 16.

The plate 10 adjacent each burner unit B is pressed downwardly in the provision of a circumferential rib 17, and the plate is apertured centrally of the rib as at 18.

The portions of the Venturi tubes T, T' formed in the upper plate 11 terminate in circular raised portions and each is provided with a vertical flange 19 and a circular horizontal seat 20 outwardly of the flange. The flange 19 is for the most part circular but includes a straight section 19' for a purpose later to appear, and the flange circumscribes a gas passage opening 21.

One of the gas burner units B is supported on each of the seats 20 and each unit comprises a burner cup 22, a port ring 31 and a ring retaining member 35.

The cup 22 includes a base flange 23 for seating engagement with the seat 20 and such flange has a part circular inner edge for surrounding the flange 19 and a straight edge section 24 for engagement with the straight flange section 19' whereby the cup is retained against rotation on its axis.

The cup has a cylindrical wall 25 from the upper end of which outwardly projects a horizontal flange 26 which in turn merges into a downwardly and outwardly directed portion 27 in the provision of a downwardly opening channel 28.

The burner cup 22 is provided in its cylindrical wall 25 with two or more relatively small ports 29 and the flange portion 27 is provided with a notch 30 in vertical alinement with the ports 29 and the ports 29 and notch 30 are in vertical alinement with port 13 or port 14 in the operative position of the cup, and such alinement is readily secured by means of the straight flange engaging portions 19' and 24, a diameter of the cup 22 bisecting the notch 30 and straight edge 24 as is clearly evident from Fig. 3.

The gas port ring 31 is adapted to seat on the horizontal cup flange 26 and such ring is formed of relatively thin metal and the ring is radially corrugated at 32, and the ring at its inner perimeter is provided with projections 33 which are directed upwardly and downwardly in alternation. These projections may readily be formed by radially slitting the ring from its inner periphery and alternately bending the portions between the slits upwardly and downwardly.

The purpose of these projections is to quickly and accurately center the ring on the cup 22 and while such centering can be accomplished with one set only of such projections, by the provision of the two sets of upwardly and downwardly directed projections the ring is readily reversible since the corrugations are symmetrical and they define the ports 34 (Fig. 2).

The ring retaining member or burner top 35 comprises a central tubular member 36 to the upper end of which a frusto conical portion 37 is welded as at 38.

The frusto conical portion 37 merges into an upwardly directed circular rib 39 providing a circular recess for reception of the upwardly directed projections 33 and the rib merges into a horizontal flange 40 which rests on the corrugated ring 31 in opposition to the flange 26.

The lower end of the tubular member 36 extends through aperture 18 and is threaded at 41.

A suitable gasket 42 is disposed between seat 20 and cup flange 23 and a gasket 43 surrounds member 36 and rests on rib 17, and a nut 44 engages the threads 41.

In assembly of a burner unit B, the gasket 42 is placed on seat 20, the cup 22 is then placed on the gasket and can be placed over the flange 19 only upon alinement of the flange straight edges 19' and 24 whereby the ports 29 and notch 30 are in a vertical plane of port 13 or port 14. The port ring 31 is next dropped onto the upper end of the cup and then the member 35 is dropped into position with its flange 40 resting upon the ring 31. The gasket 43 is now engaged over the lower end of member 36 into contact with the rib 17 whereupon the nut 44 is engaged with threads 41 and turned up sufficiently to tightly seat the gaskets and firmly draw the flanges 26 and 40 into contact with opposite sides of the ring 31.

From the foregoing detailed description of the invention, it should be appreciated that a combined drip pan and gas burner structure is provided which is relatively simple in construction and the entire structure is porcelain enameled whereby a smooth surface is provided thereby adapting the construction to quick and easy cleaning.

Furthermore, due to the easy dis-assembly of the burner units the interiors thereof, including the gas ports provided by ring 31 can be easily and quickly cleaned.

By the provision of the ports 13 and 29 together with notch 30, the structure is readily adapted for use with automatic pilot lighting mechanism.

While we have disclosed our invention in accordance with a single specific embodiment thereof, such is to be considered as illustrative only, and not restrictive, the scope of the invention being defined in the sub-joined claims.

What we claim and desire to secure by U. S. Letters Patent is:

1. In combination, a gas chamber having upper and lower spaced walls and communicating with a Venturi tube, the upper wall having a relatively large substantially circular opening surrounded by a vertical flange, a horizontal circular seat outwardly of said flange, the lower wall having an aperture smaller than said opening and concentric therewith, a circular rib encircling said aperture, a gas burner comprising a vertically disposed cup having a base flange supported on said seat, a port ring resting on the upper end of said cup, a ring retaining member including a flange overlying said port ring and a cylindrical member extending downwardly through said cup, opening and aperture, the lower end of said cylindrical member being threaded and a nut engaged with the threads of said cylindrical member and reacting against said rib for drawing said ring retaining member downwardly.

2. The structure according to claim 1 wherein said port ring is radially corrugated and provided with upwardly and downwardly extending projections being provided with a circular horizontal seat, and a gas burner unit removably disposed on said seat, said burner unit comprising a cup having a vertically disposed cylindrical wall, relatively small vertically alined ports in said wall, and a relatively larger port in said Venturi tube disposed in a vertical plane of said first ports.

3. The structure according to claim 1 wherein said ring retaining member includes a frusto-conical portion having the smaller end thereof secured to said cylindrical member and its larger end merging into said ring retaining member flange.

4. In a construction of the character described, a drip pan comprising upper and lower thin metal plates secured in face to face engagement, said plates being pressed upwardly and downwardly in the provision of a Venturi tube extending from an edge of the pan to a point within the margin thereof, the upper plate further having an upwardly pressed portion adjacent the last-named point in the provision of a circular chamber communicating with the tube, said upwardly pressed portion being provided with a circular horizontal seat, and a gas burner unit removably disposed on said seat, said burner unit comprising a cup having a vertically disposed cylindrical wall, relatively small vertically alined ports in said wall, and a relatively larger port in said Venturi tube disposed in a vertical plane of said first ports.

5. In a construction of the character described, a drip pan comprising upper and lower sheet metal plates in face to face contact, said plates being pressed upwardly and downwardly in the provision of a pair of unitary Venturi tubes extending from an edge of the pan to spaced points within the margin thereof, the upper plate having upwardly pressed portions in the provision of circular gas chambers adjacent said points and in communication with said tubes, horizontal circular seats on said portions, and gas burner units removably secured to said seats, lighting ports in said upper plate in communication with said tubes, said burner units having vertically alined ports for disposition in vertical planes of said first ports, and means on said upwardly pressed portions and said burner units for effecting said disposition of the ports.

6. In a construction of the character described, a drip pan comprising upper and lower sheet metal plates in face to face contact, said plates being pressed upwardly and downwardly in the provision of a pair of unitary Venturi tubes extending from an edge of the pan to spaced points within the margin thereof, the upper plate having upwardly pressed portions in the provision of circular gas chambers adjacent said points and in communication with said tubes, horizontal circular seats on said portions, and gas burner units removably secured to said seats, said upper plate being provided with relatively large openings within said seats, said lower plates having apertures smaller than said openings and concentric therewith, said burner units including cup members resting on said seats, port rings disposed on the upper ends of said cup members, and ring retaining members engageable with said rings and including threaded cylindrical members extending through said openings and apertures and terminating below the latter, and nuts on said threaded members and bearing on the lower faces of the lower plates for drawing said parts together.

ROY SHELTON.
JOSEPH S. ROWDEN.

REFERENCES CITED

The following references are of record in the file of this patent:

UNITED STATES PATENTS

| Number | Name | Date |
|---|---|---|
| 365,899 | Bielefeld | July 5, 1887 |
| 1,780,596 | Mandeville | Nov. 4, 1930 |
| 1,957,442 | Brombaugh et al. | May 8, 1934 |
| 2,005,560 | Rogers | June 18, 1935 |
| 2,232,482 | Schulz | Feb. 18, 1941 |
| 2,258,824 | Teller et al. | Oct. 14, 1941 |
| 2,396,800 | Mills | Mar. 19, 1946 |
| 2,403,142 | Turner | July 2, 1946 |
| 2,497,787 | Minister | Feb. 14, 1950 |

FOREIGN PATENTS

| Number | Country | Date |
|---|---|---|
| 115,182 | Germany | Nov. 29, 1900 |
| 110,841 | Switzerland | July 1, 1925 |